(12) United States Patent
Pedersen

(10) Patent No.: US 7,641,793 B2
(45) Date of Patent: Jan. 5, 2010

(54) AQUEOUS LIQUID TREATMENT

(76) Inventor: Paul Michael Pedersen, 12215 Wheeling Ave., Upper Marlboro, MD (US) 20772

( * ) Notice: Subject to any disclaimer, the term of this patent is extended or adjusted under 35 U.S.C. 154(b) by 771 days.

(21) Appl. No.: 11/206,311

(22) Filed: Aug. 17, 2005

(65) Prior Publication Data

US 2006/0037902 A1    Feb. 23, 2006

(51) Int. Cl.
*C02F 1/48* (2006.01)
(52) U.S. Cl. .................. 210/222; 210/695; 335/302; 335/303; 335/306
(58) Field of Classification Search .......... 210/222, 210/223, 695; 123/538; 184/6.25; 335/302, 335/303, 306
See application file for complete search history.

(56) References Cited

U.S. PATENT DOCUMENTS

| | | | | |
|---|---|---|---|---|
| 4,956,084 A | * | 9/1990 | Stevens | 210/222 |
| 5,273,648 A | * | 12/1993 | Caiozza | 210/222 |
| 5,354,462 A | * | 10/1994 | Perritt | 210/223 |
| 5,510,024 A | * | 4/1996 | Caiozza | 210/223 |
| 6,755,968 B2 | * | 6/2004 | Sato | 210/222 |

* cited by examiner

*Primary Examiner*—David A Reifsnyder
(74) *Attorney, Agent, or Firm*—Michael J. McGreal

(57) ABSTRACT

A plurality of magnets can be positioned around a container through the use of a plurality of holders that can be releaseably positioned around the container. Each holder has an area compatible in shape to the magnet to hold a magnet. The base of the holder which contracts the container is of a shape compatible to that of the container. There is at least one aperture on at least two sides of the holder. A strap is placed through the apertures and secured at each end. This secures the magnets to the container. The holder can have a flexible base portion or can itself be flexible. The holders can be at an angle of about 150° to about 210° to the axis of the container. The magnets can be positioned in various polar arrays around the container. The container will hold an aqueous liquid either in a static or flow condition. The container can be a bottle, pipe conduit and/or a filter within pipe conduit system.

20 Claims, 4 Drawing Sheets

AQUEOUS LIQUID TREATMENT

This invention relates to a device and method to treat aqueous liquids. More particularly this invention relates to a device and method to magnetically treat aqueous liquids.

BACKGROUND OF THE INVENTION

It is known to treat water and other liquids with magnets to purify the water, reduce hardness, reduce scaling, and improve the taste of water based beverages. Water is a polymer in an (—H—O—H—O—H—O—) of an n-dimensional structure. There is a continuous hydrogen bonding to form this structure. This hydrogen bonding produces a sufficient chain length to create a liquid from this string of hydrogen and oxygen atoms. Since water has a polar structure due to the hydrogen bonding it will be susceptible to be affected by an applied magnetism. The positive/negative structure of the water molecules will be affected by the north/south fields of magnets.

Water is paramagnetic. Paramagnetism occurs primarily in substances in which some or all of the individual atoms, ions, or molecules possess a permanent magnetic dipole moment. The magnetization of such matter depends on the ratio of the magnetic energy of the individual dipoles to the thermal energy. Water has a dipole moment.

Ground water contains thousands of particles and microelements whose impurities give rise to the surrounding electron shells: cations (+), anions (−). "Pure" water is a polar liquid, i.e. part of the water molecule has a positive and part of it has a negative, electrical charge, but overall the net electrical charge is negative. Thus, the water molecule being a small magnet (dipole), one may effect its magnetic (or electric) field by causing the molecule to turn or rotate in one direction or the other, taking on a positive or negative higher potential, depending, whether the S (South, positive) or N (negative) outside magnetic field had been applied.

Water, being dipolar, can be partly aligned by an electric field and this may be easily shown by the movement of a stream of water by an electrostatic source. Even partial alignment of the water molecules with the electric field will cause pre-existing hydrogen bonding to become bent or broken. The balance between hydrogen bonding and van der Waals attractions is thus biased towards van der Waals attractions giving rise to less cyclic hydrogen bonded clustering.

Magnets affect the bonding angle between the hydrogen and the oxygen atom in the water molecule. Magnetized water causes the hydrogen-oxygen bond angle within the water molecule to be reduced from 104 to 103 degrees. This in turn causes the water molecule to cluster together in groups of 6-7 rather than 10-12. The smaller cluster leads to better absorption of water across cell walls.

In U.S. Pat. No. 4,888,113 there is described a device that can be clamped onto a pipe for the treatment of water passing through the pipes. An objective is to reduce the amount of scaling of the pipes by the minerals dissolved in the water. U.S. Pat. No. 5,573,664 disposes magnets in a shower head to treat the shower water. The water can be treated to enhance the cleaning and treatment of the skin. U.S. Pat. No. 5,113,751 involves the treatment of coffee beverage water. The treated water and/or coffee enhances the flavor of the coffee. These are some of the uses of magnetism to enhance the use of water. It makes the water more useful and more palatable. It further makes the water more bio-available in that it can be absorbed faster by body tissue.

The present invention is directed to the treatment of water containers with magnets to enhance the utility of the water. The water will be more bio-available when directly ingested and will enhance the flavor of a beverage when used to produce a beverage. The water will be more effectively used by a person's body. The advantage of the present magnetic units is that they can be fitted to a wide range of container shapes and sizes. In addition the magnets can be arranged in various arrays around a container. In this way there is a maximum of versatility. The treatment of the water can be customized to the shape and size of the container and the needs of an individual. As used herein the term container includes any structure for holding static or flowing water. This can be a tank, jug, bottle, carafe, pitcher, pipe, filter unit and any other structure for containing static or flowing water. Further as used herein the term water includes viscous substances which contain water such as gels, lotions, mixtures, suspensions and other liquid/solid and liquid/liquid combinations.

BRIEF DESCRIPTION OF THE INVENTION

The invention comprises magnet holders and the connection of a plurality of magnet holders so that they can be disposed around a container. The invention further comprises a container and plurality of magnets within magnet holders surrounding the container, each of the magnets within a holder, the holder being in contact with the container. The container can have a bottom and be open or closed at the top. The container also can be a conduit through which the water flows. The base of the holder can be in contact with the container and have a shape that is compatible with the shape of the container or the magnets can be in contact with the container. The ends of the holders have apertures that can be substantially parallel to the axis of the container and adapted to receive a flexible strap. The flexible strap will hold the plurality of magnets in contact with the containers. The holders can have a flexible base or can be constructed of a flexible material. The flexible strap can be used to secure the magnets in the holders or the magnets can be mechanically secured in the holders through an interference fit. The magnets can be arranged around a container in various arrays. These can be (-N-S-N-S-N-S-), (-S-S-N-N-S-S-), (-S-N-N-S-N-N-), (-N-S-S-N-S-S-), (-S-S-S-S-S-S-) or (-N-N-N-N-N-N-) arrays. The array and the number of magnets in an array will depend on the use. The number can range from 1 to 50 or more. However a (-N-S-N-S-N-S-) array in preferred for most portable containers. The number of magnets will usually be about 3 to 10.

In a yet further embodiment the magnets can be held within recesses of the periphery of the container. The magnets can be in the same arrays and can be held in the recesses by an interference fit, adhesive or by an encircling strap.

DETAILED DESCRIPTION OF THE INVENTION

The invention will be set out in the preferred embodiments with reference to the drawings. However, the invention can be modified but will still be within the present concept.

Figure 1:
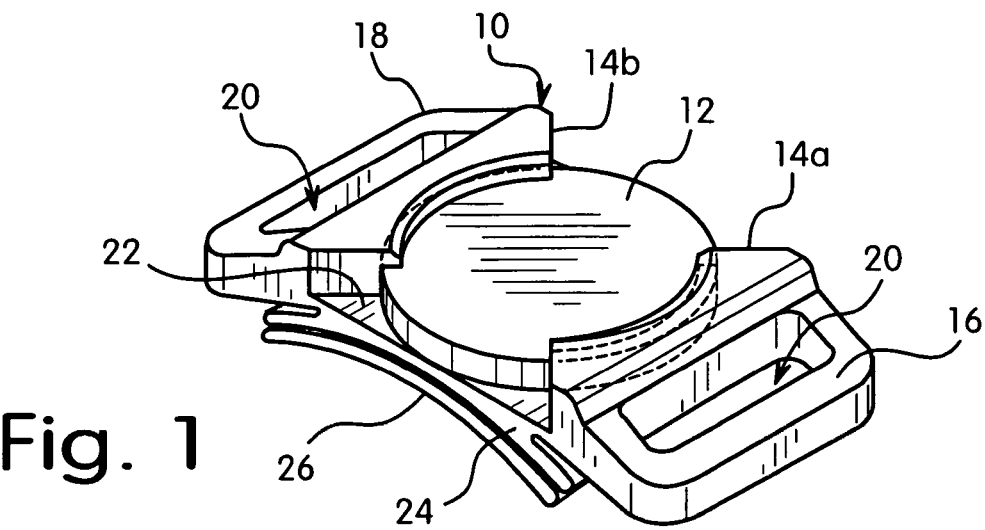
FIG. 1 is a perspective view of a holder and magnet.

FIG. 1 discloses a holder 10 and magnet 12 to be attached to a container. The magnet 12 is maintained in holder 10. The holder 10 is comprised of a lower magnet support 22 and magnet securing ledge portions 14(*a*) and 14(*b*). Adjacent the magnet securing ledge portions are flexible strap holders 16 and 18. Each of these holders has at least one aperture 20. A flexible strap will pass through each aperture 20 and over the magnet 12. This further secures the magnet in the holders 10. Below the magnet support 22 is container contact surface 24. Shown here also is a cushion gasket 26 which can be an integral part of the contact surface 24.

Figure 2:
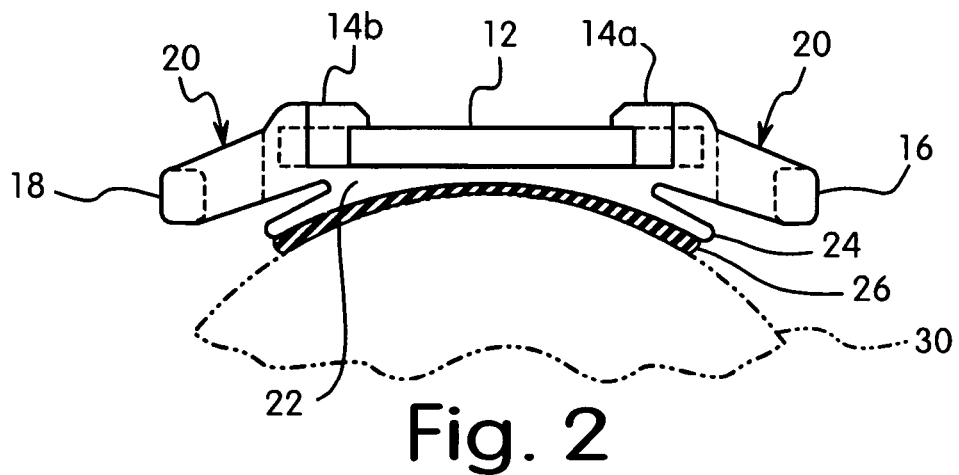
FIG. 2 is an elevation view of the holder and magnet of FIG. 1 on a container.
Figure 3:
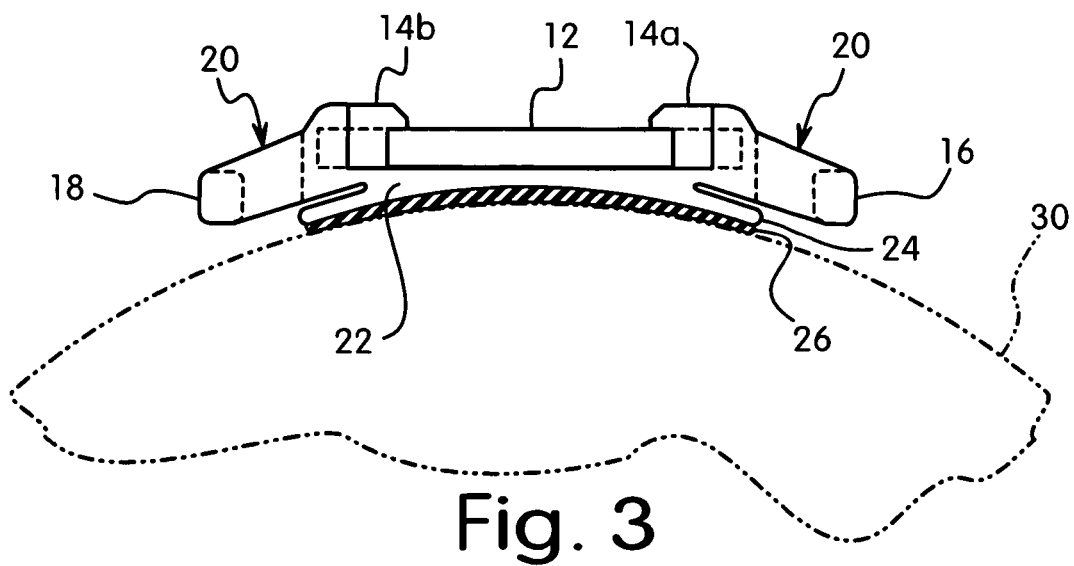
FIG. 3 is an elevation view of a holder and magnet on a container of a larger diameter.

FIG. 2 shows the holder 10 and magnet 12 on a relatively small container 30 and FIG. 3 on a relatively large container 30. The cross-sectional views in FIG. 2 and FIG. 3 provide an enhanced description of how the magnets 12 and holders 10 relate to the container.

Figure 8:
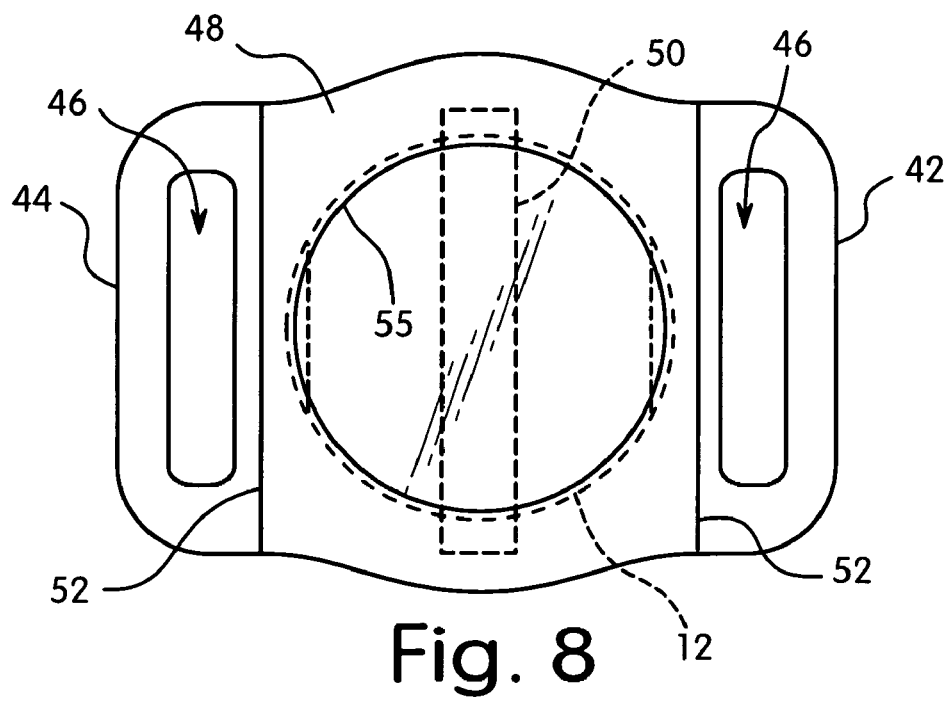
FIG. 8 is a bottom plan view of the holder of FIG. 6 showing an alternate magnet holder means.

FIGS. 4 to 8 describe an alternate embodiment for the magnet holder. These magnet holders can be more flexible. That is, under the force of the strap attaching the magnet and holders to the container 34 the holder can flex. Holder 40 has a base 52 for contact with container 34. Upper structure 48 is the primary support for the magnet 12. The magnet fits into the upper structure formed by perimeter 47. Ledges 54 and strengthening beam 50 form a support for magnet 12 and which together with perimeter 47 maintain the magnet in the holder 40. The strap also will assist in holding the magnet 12 in the holder. Strap holders 42 and 44 have apertures 46 for holding the strap. The ledges 54 can be of a dimension to support the magnets or can be protrusions to contact the magnets to provide an interference fit of the magnet to the holder. In an interference fit the magnets will be held in place by fiction. In addition as shown in FIG. 8 there can be a gripping flange 55 to hold the magnets within the holders. In the interference fit embodiments the magnets can extend below the magnet holders and contact the container. The magnets are inserted up into the magnet holders and held from falling out by the interference fit at the bottom and the perimeter 47 and strengthening beam 50 at the top.

Figure 4:
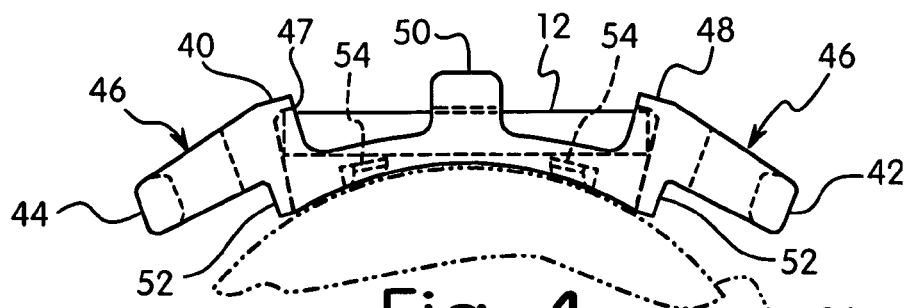
FIG. 4 is an elevation view of a holder and magnet where the holder is flexible to fit a smaller container.
Figure 5:
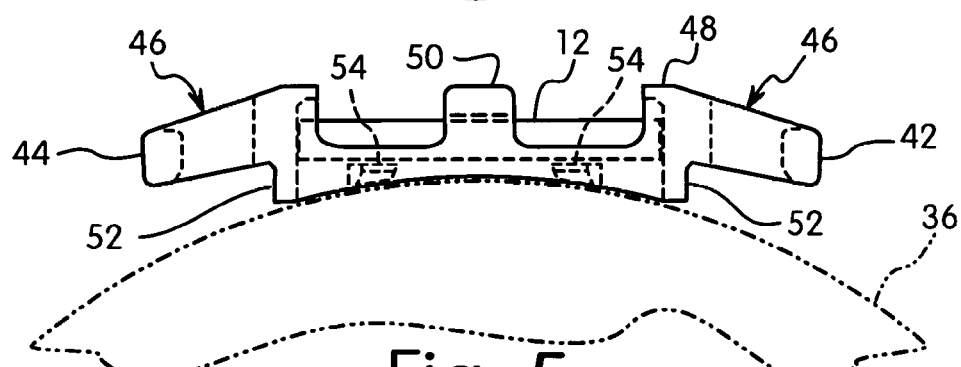
FIG. 5 is an elevation view of a holder and magnet where the holder is flexible to fit a larger container.
Figure 6:
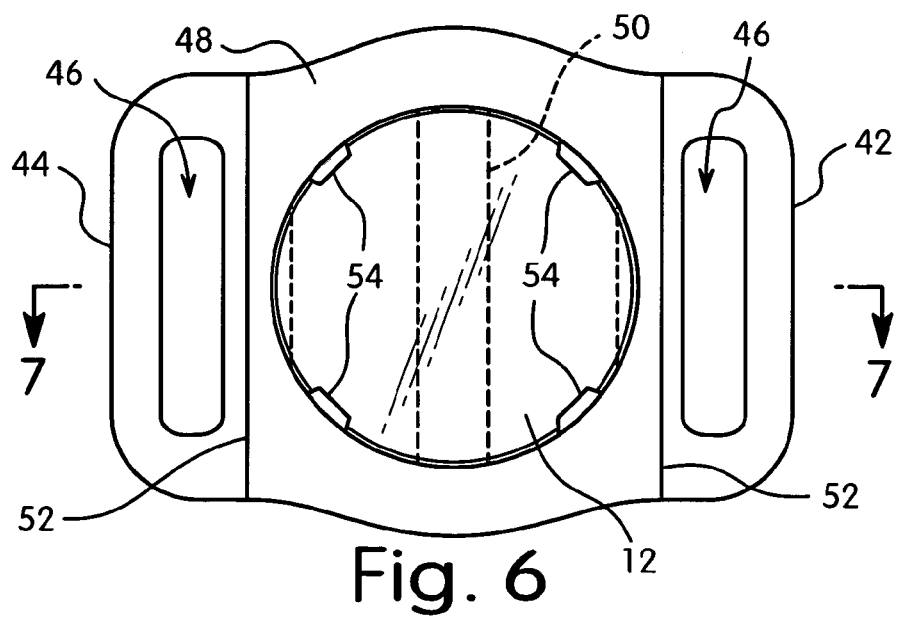
FIG. 6 is a bottom plan view of the holder and magnet of FIGS. 4 and 5.
Figure 7:
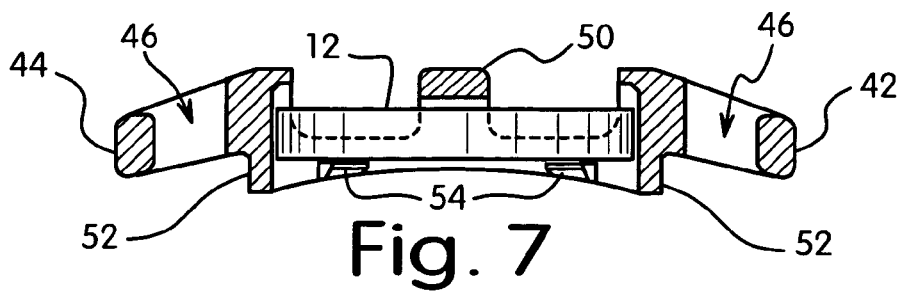
FIG. 7 is a view of the holder and magnet of FIG. 6 along line 7-7.

In FIG. 4 this magnet holder is shown as flexed with the magnet contacting the beam 50 and tabs 54. In FIG. 5 since the container has a large diameter the magnet holder 40 is not flexed. FIG. 6 shows the embodiment of FIG. 5 in more detail in a top plan view and FIG. 7 in yet more detail in a cross-section view along 7-7 of FIG. 6. In the views of FIGS. 4-8 there is shown that a change in the diameter of the container 34, 36 can be accommodated by a flex in holder 40 or of the base of the holder 40 as shown in FIGS. 2 and 3. This also can be accommodated as shown by the further use of a gasket 26 as shown in FIGS. 2 and 3. This increases the versatility of the magnet holder and will allow a particular magnet and magnet holder to be utilized on a range of container shapes and types.

Figure 9:
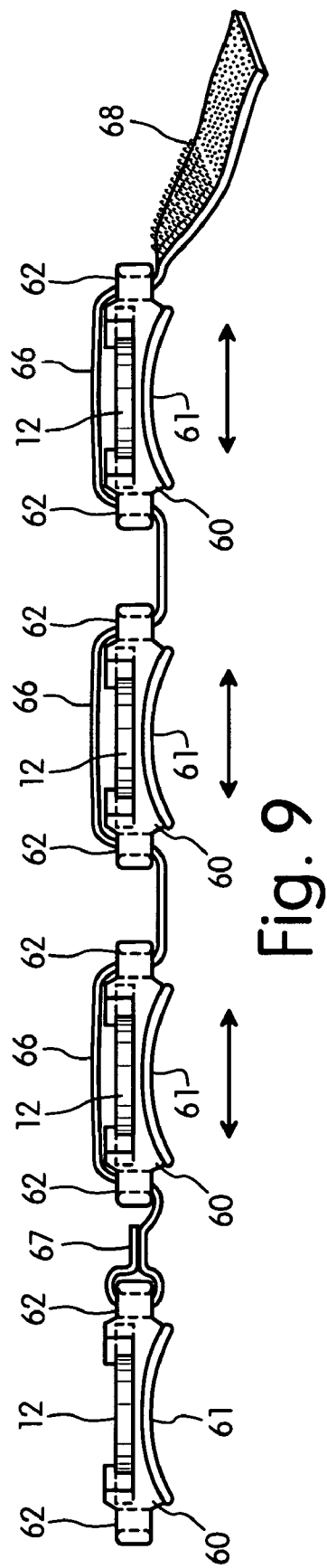
FIG. 9 is an elevation view of a plurality of magnet holders connected by a strap.
Figure 10:
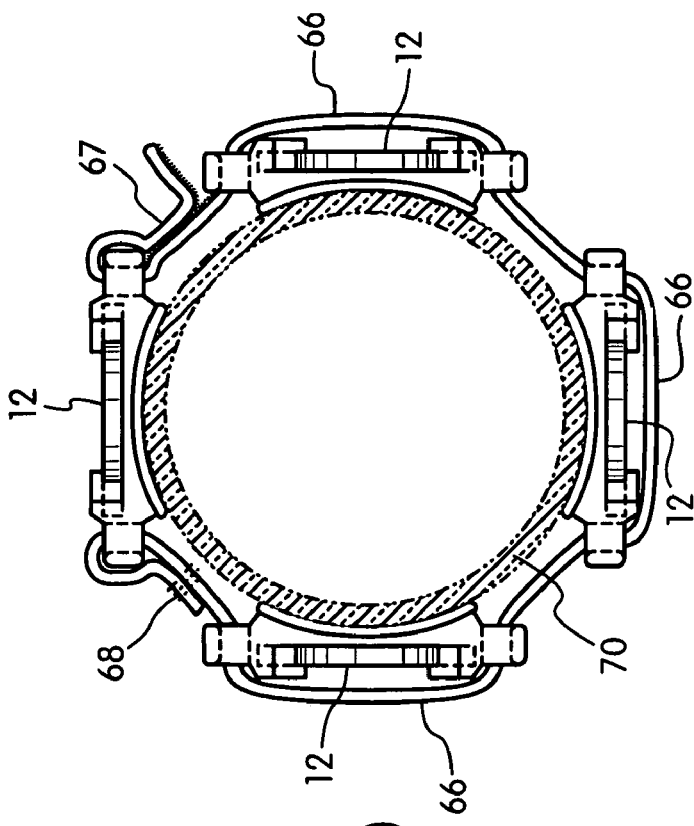
FIG. 10 is a cross-section view of the magnets of FIG. 9 on a container.

FIG. 9 shows a plurality of magnets 12 in magnet holders 60 that are connected by strap 66. The strap 66 is threaded through apertures 62 of the magnet holders 60. The lower surface 61 of the magnet holders 60 can contact the container 70 as is shown in FIG. 10. However the magnets can extend to or below lower surface 61 when the embodiment of FIGS. 4 to 8 is used and the magnets are held in an interference fit within the holders. The strap 66 can have a hook and loop structure such as available as VELCRO so that it can be attached to itself. However the strap if not having the hook and loop structure can be connected by any commonly used attaching and securing technique and structure.

Figure 11:
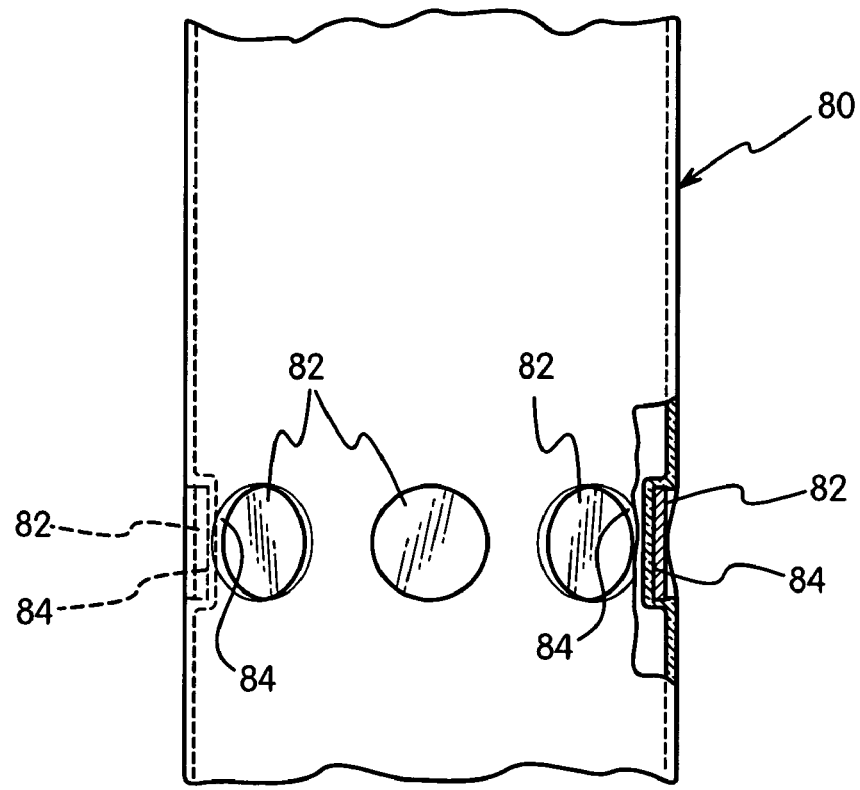
FIG. 11 is a partial elevation view of a container with magnets within container recesses.

FIG. 11 shows a container 80 with magnets 82 within recesses 84 of the container. The magnets will be held in a friction fit within the recesses 84 or they can be held in place by a surrounding band. In addition they can be maintained within the recesses through the use of an adhesive. Here the container also can be one for static or flowing water.

The holders can be made out of a range of plastics from thermoplastics to thermoset plastics such as polyamides and phenolics. The useful thermoplastics include polymers and copolymers of ethylene, propylene, butadiene and butene. Useful polyamides are the nylons.

The magnets can be used in various arrays around a container. These include a (-N-S-N-S-N-S-), (-S-S-N-N-S-S-), (-S-N-N-S-N-N-), (-N-S-S-N-S-S-), (-N-N-N-N-N-N-) or (-S-S-S-S-S-S-) array. This will be determined by how the magnet is mounted in the holder and how the holders are mounted on a container. It also will be determined with regard to the size of the container, the beverage contents of the container, the mineral content of the beverage and other factors such as the desired effect to be produced. The number of magnets used also will depend on these many factors. These can range from 1 to 50 magnets or more, and usually will be 3 to 10 magnets. The strength of the magnets will range from about 500 gauss to about 20,000 gauss or more and usually about 1000 gauss to about 10,000 gauss. The magnets will be mounted at an angle of about 150 degrees to about 210 degrees to the axis of the container, and usually at about 180 degrees.

EXAMPLE

The following example shows the effect of magnetized water on the growth of an organism, in this case being Mung bean plants.

Various orientations of magnetic fields were used to treat both filtered and non-filtered tap water to determine what effect the magnet orientation itself had in the germination and growth patterns of the Mung bean plants. The magnet orientations were duplicated on both water bottles containing filtered and also non filtered city tap water. Non-magnetically treated filtered and unfiltered city tap water bottles were also as a control. A duplicate container of Mung beans was used to validate that the results were consistent and valid.

The experiment was conducted under controlled conditions where variables pertaining to germination rate e.g. light, temperature, humidity, soil condition, etc were constant. Ten Mung beans were placed in the same orientation in the containers with soil that was the same for all containers. Containers were all filled with the same soil to the same depth and 10 Mung beans were placed in the same orientation in each cup. Two cups were then selected randomly for each water sample.

The study was conducted to observe and compare the difference in the germination and growth patterns of the Mung beans when subjected to four basic types of water samples:

1. City tap water which measured a 1.0 ppm of chlorine residual throughout the experiment.

2. Filtered city tap water
3. Magnetized Filtered city tap water subjected to 6 various magnet orientations.
4. Magnetized city tap water subjected to 6 various magnet orientations The results were interesting in that the containers of Mung beans responded differently with the following results:

1. The city tap water fed containers averaged a 15% germination success rate and demonstrated a poor growth pattern and averaged a height of 9.36 cm.
2. The filtered water fed containers averaged an 85% germination success rate and demonstrated a healthy growth pattern and averaged a height of 14.00 cm.
3. The magnetized filtered water fed containers averaged a 100% germination success rate which was also demonstrated a faster growth rate as compared to both the filtered and non-filtered water. However, even though the growth pattern was clearly much healthier that of the City tap water there was observable differences in the growth patterns of the different types of magnetic oriented water.
   A. The seeds that were fed the south pole only treated water -S-S-S-S- germinated faster and grew at a faster rate. It was noticed however that the stalks did not grow strong enough to support the upper plant structure and averaged a height of 13.85 cm.
   B. The seeds that were fed the north pole only water -N-N-N-N- germinated slowest but were able to stand more erect and averaged a height of 11.16 cm.
   C. The seeds that were fed the -N-N-S-S- pole water germinated at a rate in between the A and B and were also as tall and stood erect and averaged a height of 13.015 cm.
   D. The seeds that were fed the -N-S-N-S- pole water germinated at a rate in between the A and B and were also as tall and stood erect and averaged a height of 10.675 cm.
   E. The seeds that were fed the water from a bottle that had both an -S-S-S-S- and N-N-N-N pole germinated at a rate in between the A and B and were also as tall and stood erect and averaged a height of 10.25 cm.
   F. The seeds that were fed with water mixed 50-50 with the A and B water germinated at a rate in between the A and B and also were as tall and stood erect and averaged a height of 11.025 cm.
4. The magnetized city tap (unfiltered) water fed containers averaged a 100% germination success rate which also demonstrated a faster growth rate as compared to non-magnetized water (both the filtered and non filtered). Remarkably, the germination rates and growth patterns were identical to the magnetized filtered water containers:
   A. The Mung bean seeds that were fed the south pole only treated water -S-S-S-S- germinated faster and grew at a faster rate. It was noticed however that the stalks did not grow strong enough to support the upper plant structure and averaged a height of 14.43 cm.
   B. The seeds that were fed the north pole only water -N-N-N-N- germinated slowest but were able to stand more erect and averaged a height of 14.75 cm.
   C. The seeds that were fed the -N-N-S-S- pole water germinated at a rate in between the A and B and were also as tall and stood erect and averaged a height of 14.23 cm.
   D. The seeds that were fed the -N-S-N-S- pole water germinated at a rate in between the A and B and were also as tall and stood erect and averaged a height of 13.90 cm.
   E. The seeds that were fed the water from a container that had both a -S-S-S-S- and -N-N-N-N- pole germinated at a rate in between the A and B and were also as tall and stood erect and averaged a height of 14.325 cm.
   F. The seeds that were fed with water mixed 50-50 with the A and B water germinated at a rate in between the A and B and were also as tall and stood erect and averaged a height of 12.95 cm.

CONCLUSIONS

There were notable results of the seeds fed with magnetic treated and non-magnetic treated water. The magnet treated water was more available to the plant and promoted plant growth. It is more bio-available. Surprisingly, the seeds fed with non-filtered magnetic water responded almost identically to those fed with the filtered magnetic treated water (both had a 100%) germination rate. Yet the non-filtered (non-magnetic) water fed seeds responded poorly (15% germination rate). The filtered (non-magnet) fed seeds had an 85% germination rate. What was interesting is the effect that the magnets had on the non-filtered water compared to the non magnet non filtered water 100% germination rate vs. 15%.

However there were further results that proved interesting. In every case the magnet treated water whether filtered or not had a high germination rate. However, the configuration of the magnets had a noticeable and measurable effect on the over all health of the plant.

It was observed that the -S-S-S-S- configured promoted the fastest growth and averaged 14.13 cm but the stalks were not strong enough to support the leaves.

It was observed that the -N-N-N-N- configured promoted the slower growth and averaged 11.95 cm. The stalks were strong enough to support the leaves.

It was observed that when the -N-N-N-N- configured water was mixed equally with the S-S-S-S configured water promoted an average growth rate averaged 11.98 cm. The stalks were strong enough to support the leaves.

It was observed that when water from a bottle with both an -N-N-N-N- configured and -S-S-S-S- configured promoted an average growth rate and averaged 12.28 cm. The stalks were strong enough to support the leaves.

It was observed that the -N-S-N-S- configured promoted an average growth and averaged 12.28 cm. The stalks were strong enough to support the leaves.

It was observed that the -N-N-S-S- configured promoted an average growth and averaged 13.62 cm. The stalks were strong enough to support the leaves.

The invention claimed is:

1. A container for a static aqueous substance comprising a container having a container body, a container bottom and a container top, said container body having a curvature, the static aqueous substance in the container body, a plurality of magnets surrounding the container body, each of said plurality of magnets within a holder, each holder having a magnet holding center portion with lateral ends, each center portion having a curvature similar to that of the container body, each holder being in contact with said container body, the lateral ends of each holder having apertures which are substantially parallel to the longitudinal axis of said container body whereby a flexible strap having ends can be passed through said apertures, the ends of said flexible strap secured to maintain each of said holders in close contact with said container body.

2. A container as in claim 1 wherein each holder has retaining ledges, each of said magnets being held in each center portion by retaining ledges.

3. A container as in claim 1 wherein said holders have a resilient portion which contacts said container.

4. A container as in claim 1 wherein said holders are flexible.

5. A container as in claim 1 wherein said plurality of magnets have a degree of movement in said holders.

6. A container as in claim 1 wherein said plurality of magnets is maintained within said holders by means of an interference fit.

7. A container as in claim 1 wherein the holders are made of a thermoplastic or a thermoset plastic.

8. A container as in claim 1 wherein said container is one of a jug, bottle, carafe or pitcher.

9. A container as in claim 1 wherein there are about 3 to 10 magnets.

10. A container as in claim 1 wherein the magnets have a strength of about 1000 gauss and 10,000 gauss.

11. A container for flowing an aqueous substance comprising a conduit, the conduit having a first end and a second end, the first end and the second end being open, the aqueous substance flowing through the conduit, a plurality of magnets surrounding the conduit, each of said plurality of magnets within a holder, each holder being flexible and having a magnet holding center portion with lateral ends, each center portion having a curvature similar to that of the conduit, each holder being in contact with said conduit, the lateral ends of each holder having apertures which are substantially parallel to the longitudinal axis of said conduit whereby a flexible strap having ends can be passed through said apertures, the ends of said flexible strap secured to maintain each of said holders in close contact with said conduit.

12. A container as in claim 11 wherein there are about 3 to 10 magnets.

13. A container as in claim 11 wherein the magnets have a strength of about 1000 gauss and 10,000 gauss.

14. A container for a static aqueous substance comprising a container having a container body, a plurality of recesses on the periphery of the container body, a container bottom and a container top on the container body, the static aqueous substance in the container body, a plurality of magnets surrounding the container body, said plurality of magnets are held within the recesses on the periphery of the container body.

15. A container as in claim 14 wherein said plurality of magnets are held within recesses of the periphery of the container body by a friction fit.

16. A container as in claim 14 wherein said plurality of magnets are held within recesses of the periphery of the container body by an adhesive.

17. A container as in claim 14 wherein said plurality of magnets are at an angle of about 150° to 210° to longitudinal the axis of the container body.

18. A container as in claim 14 wherein there are about 3 to 10 magnets.

19. A container as in claim 14 wherein the magnets have a strength of about 1000 gauss and 10,000 gauss.

20. A container as in claim 14 wherein said container is one of a jug, bottle, carafe or pitcher.

* * * * *